United States Patent
Gretz (10) Patent No.: US 8,297,579 B1
(45) Date of Patent: Oct. 30, 2012

(54) ELECTRICAL BOX HANGER ASSEMBLY FOR A SUSPENDED CEILING

(75) Inventor: Thomas J. Gretz, Port St. Lucie, FL (US)

(73) Assignee: Arlington Industries, Inc., Scranton, PA (US)

(*) Notice: Subject to any disclaimer, the term of this patent is extended or adjusted under 35 U.S.C. 154(b) by 400 days.

(21) Appl. No.: 12/799,273

(22) Filed: Apr. 21, 2010

(51) Int. Cl.
*B42F 13/00* (2006.01)

(52) U.S. Cl. ............ 248/343; 248/200.1; 248/201; 248/906; 220/3.9

(58) Field of Classification Search .......... 248/343, 248/200.1, 201, 906, 57, 229.16; 174/48, 174/63; 220/3.9, 3.2, 3.3
See application file for complete search history.

(56) References Cited

U.S. PATENT DOCUMENTS

| | | | |
|---|---|---|---|
| 3,214,126 A * | 10/1965 | Roos | 248/318 |
| 4,041,657 A | 8/1977 | Schulpin | |
| 4,149,693 A * | 4/1979 | LoNigro | 248/342 |
| 4,909,405 A * | 3/1990 | Kerr, Jr. | 220/3.9 |
| 5,435,514 A * | 7/1995 | Kerr, Jr. | 248/343 |
| 5,619,263 A | 4/1997 | Laughlin et al. | |
| 5,934,631 A | 8/1999 | Becker et al. | |
| 6,761,341 B2 | 7/2004 | Pfaller | |
| 7,735,794 B1 * | 6/2010 | Gretz | 248/343 |
| 7,857,275 B2 * | 12/2010 | de la Borbolla | 248/342 |
| 8,158,884 B2 * | 4/2012 | de la Borbolla | 174/54 |
| 2003/0079894 A1 * | 5/2003 | Weise et al. | 174/50 |
| 2008/0296460 A1 * | 12/2008 | Kerr, Jr. | 248/343 |
| 2010/0110698 A1 * | 5/2010 | Harwood et al. | 362/365 |

* cited by examiner

*Primary Examiner* — Amy J Sterling (57) ABSTRACT

A hanger assembly for supporting an electrical box above a drop ceiling having a grid supporting structure. The assembly includes an elongated one-piece bar with a U-shaped cross-section, an end bracket secured at each end of the bar, a center bracket, an anchor bar, and an electrical box. The end brackets include an inner leg for resting on the horizontal ledges of adjacent T-rails and arms for loosely fitting over the top of the T-rails. A fastening arrangement for securing the electrical box to the elongated bar enables mounting the electrical box in two ways. The electrical box can be mounted with its sides square with the bar or with the sides at a 45° angle to the bar. Mounting the electrical box with the sides at a 45° angle provides full access to all knockout apertures in the sidewalls of the electrical box.

15 Claims, 8 Drawing Sheets

ELECTRICAL BOX HANGER ASSEMBLY FOR A SUSPENDED CEILING

FIELD OF THE INVENTION

This invention relates to supports for electrical junction boxes and specifically to an improved load bearing hanger for a suspended or drop ceiling.

BACKGROUND OF THE INVENTION

Electrical boxes are commonly installed above suspended or grid ceilings in order to provide secure enclosures for making electrical connections to supply the various electrical needs including lights, fans, and electrical outlets. Hangers for supporting such electrical boxes typically include anchoring structure above the electrical box to enable the electrical box to be tied off or supported from above by a chain, wire, or similar device.

Heretofore, hangers for grid ceilings typically provided a limited amount of knockouts or access apertures for the connection of conduit or cables. The limited amount of access apertures is typically a result of the anchoring structure interfering with access to each of knockouts on the electrical box. Thus an installer was limited in the amount of electrical conduit or cable that could be connected to the electrical box.

Accordingly, it would be advantageous to provide an electrical box hanger for supporting an electrical box above a suspended or drop ceiling in such a manner that all of the knockouts on the electrical box are available for use. Additionally, it would be advantageous to provide an electrical box hanger that was simple to install and could be manufactured at low cost.

SUMMARY OF THE INVENTION

The invention is a hanger assembly for supporting an electrical box above a drop ceiling having a grid supporting structure. The assembly includes an elongated one-piece bar with a U-shaped cross-section, an end bracket secured at each end of the bar, a center bracket, an anchor bar, and an electrical box. The end brackets include an inner leg for resting on the horizontal ledges of adjacent T-rails and arms for loosely fitting over the top of the T-rails. A fastening arrangement for securing the electrical box to the elongated bar enables mounting the electrical box in two ways. The electrical box can be mounted with its sides square with the bar or with the sides at a 45° angle to the bar. Mounting the electrical box with the sides at a 45° angle provides full access to all knockout apertures in the sidewalls of the electrical box.

OBJECTS AND ADVANTAGES

Several advantages are achieved with the suspended ceiling electrical box hanger assembly of the present invention, including:
(1) The hanger assembly is an assembly of components that can be manufactured at low cost. Many of the parts, including the bar and end brackets, may be stamped and shaped from sheet metal. This lowers the cost of production of the support assembly.
(2) The hanger assembly enables an installer to mount the electrical box to the bar in such a manner that knockouts on all four sides of the electrical box will be available for making connections, thus greatly enhancing the functionality of the electrical box.
(3) Ample clearance is provided between the arms and end plate of each end bracket. This enables rapid placement and mounting of the electrical box hanger assembly over the bulb portions of adjacent T-rails in a drop ceiling.
(4) An anchor bar, provided for supporting the hanger assembly from an overhead structure, is integral with the elongated bar thereby having the advantage of supporting the load from the bar rather than from the electrical box.
(5) The hanger assembly includes an elongated bar and a center bracket having U-shaped cross-sections that advantageously provide extensive surface contact between them when secured together to support an electrical box.

These and other objects and advantages of the present invention will be better understood by reading the following description along with reference to the drawings.

TABLE OF NOMENCLATURE

The following is a listing of part numbers used in the drawings along with a brief description:

| Part Number | Description |
| --- | --- |
| 20 | electrical box hanger assembly |
| 22 | elongated bar |
| 24 | electrical junction box |
| 26 | center bracket |
| 28 | end piece |
| 30 | anchor bar |

| Part Number | Description |
|---|---|
| 32 | base portion of bar |
| 34 | upward extending sides |
| 36 | ends of bar |
| 38 | paired slots and round apertures |
| 40 | slot |
| 42 | round aperture |
| 44 | end aperture |
| 46 | end plate |
| 48 | arm |
| 50 | U-shaped top member |
| 52 | aperture in arm |
| 54 | aperture in top member |
| 56 | aperture in end plate |
| 58 | side walls |
| 60 | end of end plate |
| 62 | leg of end plate |
| 64 | bottom edge of leg |
| 66 | bottom wall of junction box |
| 68 | sidewall |
| 70 | knockout |
| 72 | corner |
| 74 | tab |
| 76 | threaded fastener |
| 78 | raised area |
| 80 | inner cavity |
| 82 | threaded bore |
| 84 | grounding screw |
| 85 | bore in bottom wall of electrical box |
| 86 | base portion of center bracket |
| 88 | bottom |
| 90 | side |
| 92 | wing |
| 94 | threaded bore |
| 96 | threaded bore |
| 97 | axis through first pair of bores in center bracket |
| 98 | axis through second pair of bores in center bracket |
| 101 | top portion of anchor bar |
| 103 | leg of anchor bar |
| 105 | V-shaped projection |
| 107 | clip member |
| 109 | base portion of clip member |
| 111 | post |
| 113 | rivet |
| 115 | threaded fastener |
| 117 | T-rail |
| 119 | grid ceiling support structure |
| 121 | horizontal flange |
| 123 | longitudinal axis of elongated bar |
| 125 | electrical box cover plate |
| 127 | fastener |
| D1 | center to center distance between bores |
| Θ1 | angle between pairs of bores in center bracket |

DETAILED DESCRIPTION OF THE INVENTION

Figure 1:
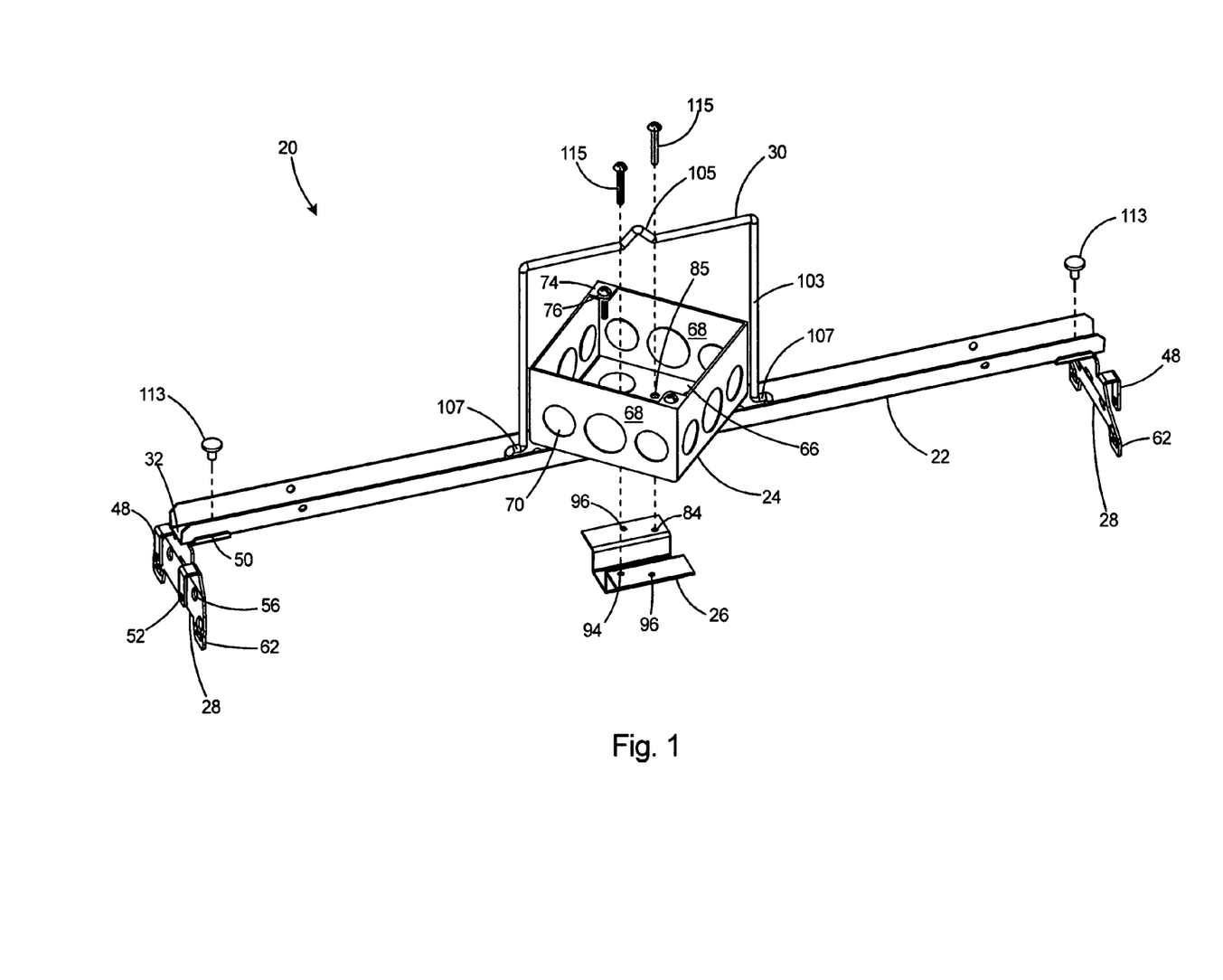
FIG. 1 is a perspective view of a preferred embodiment of a suspended ceiling junction box hanger assembly according to the present invention.

The present invention comprises a junction box hanger assembly for supporting an electrical junction box on a conventional suspended or drop ceiling. With reference to FIG. 1, there is shown a preferred embodiment of the electrical box hanger assembly 20 including an elongated bar 22, an electrical junction box 24, a center bracket 26, two end pieces 28, and a center anchor or anchor bar 30.

Figure 2:
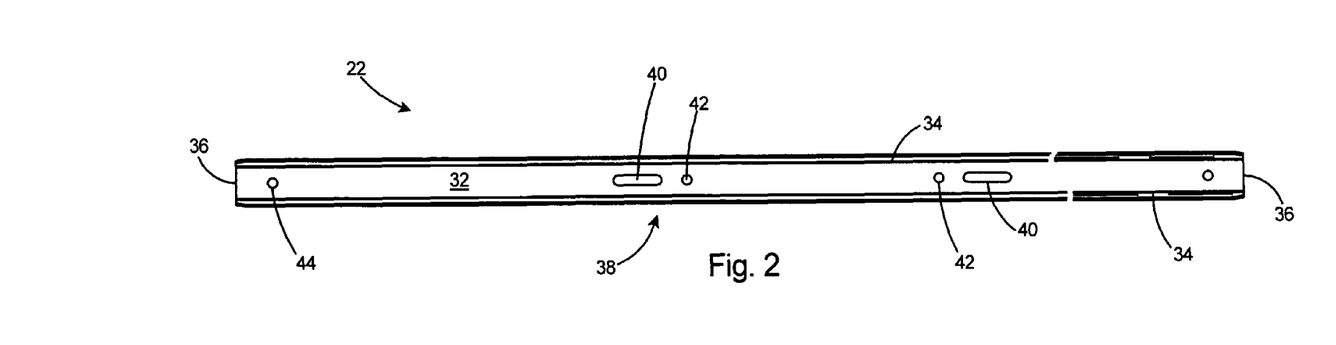
FIG. 2 is a top view of an elongated hanger bar that forms a portion of the hanger assembly of FIG. 1.
Figure 3:
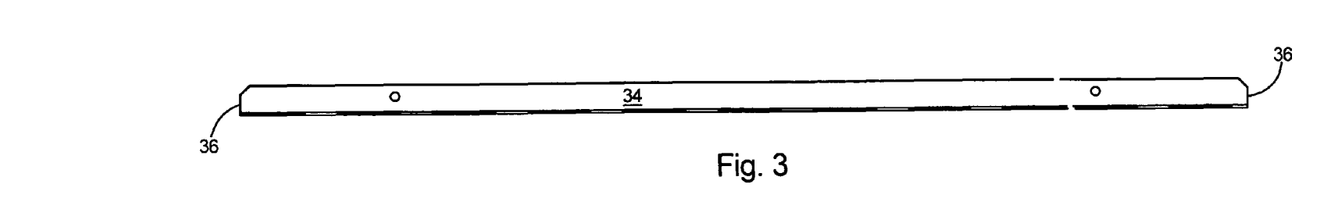
FIG. 3 is a side view of the hanger bar of FIG. 2.
Figure 4:
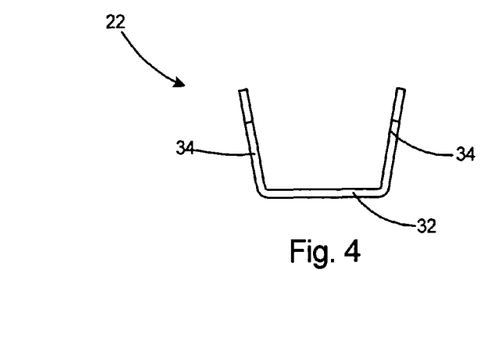
FIG. 4 is an end view of the hanger bar.
Figure 5:
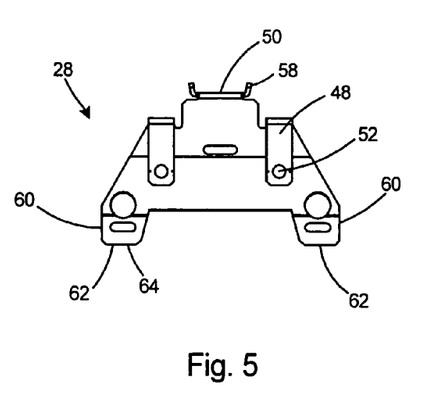
FIG. 5 is a front elevation view of an end piece that forms a portion of the hanger assembly of FIG. 1.
Figure 6:
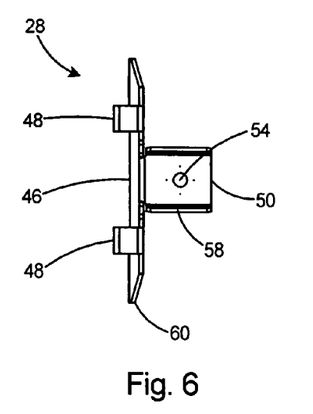
FIG. 6 is a top view of the end piece depicted in FIG. 5.
Figure 7:
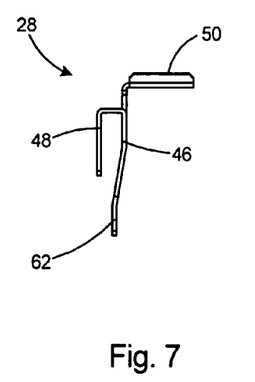
FIG. 7 is an end view of the end piece depicted in FIG. 5.
Figure 8:
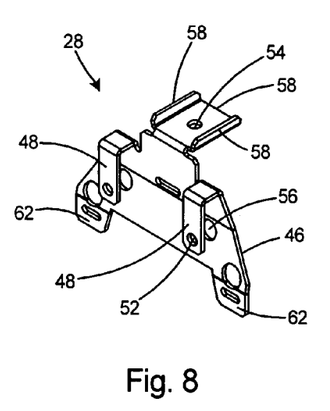
FIG. 8 is a perspective view of the end piece.

Referring to FIGS. 2-4, the one-piece elongated bar 22 is of substantially U-shaped cross section and includes a base portion 32, two upward extending sides 34, and two ends 36. The base portion 32 of the bar 22 includes two paired arrangements 38 of slots 40 and round apertures 42. The base portion 32 further includes end apertures 44 substantially near the ends 36 of the bar.

With reference to FIGS. 5-8, the end pieces 28 each include an end plate 46, two arms 48 extending outwardly and downwardly from the end plate 46, and a U-shaped top member 50. The end piece 28 further includes an aperture 52 in each of the arms 48, an aperture 54 in the top member 50, and a pair of apertures 56 in the end plate 46 with the apertures 56 in the end plate 46 axially aligned with the apertures 52 in each arm 48. Upward extending side walls 58 are provided on the top member 50 portion of the end bracket 26. The end plates 46 include two ends 60 and a downward extending leg 62 on each of the ends 60. Each of the downward extending legs 62 of the end plates 46 includes a planar or flat bottom edge 64. The apertures 56 in the end plate 46, being axially aligned with the apertures 52 in the arms 48, enable passage of a fastener (not shown) there through for anchoring the hanger assembly 20 to a grid support structure for a suspended ceiling.

Figure 9:
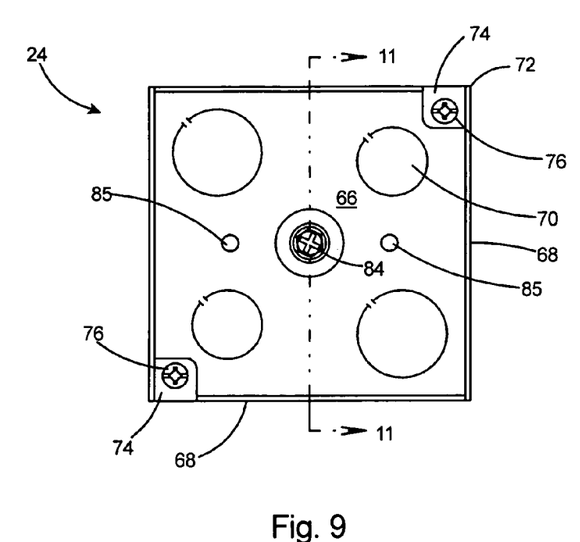
FIG. 9 is a top view of an electrical box that forms a portion of the hanger assembly of FIG. 1.
Figure 10:
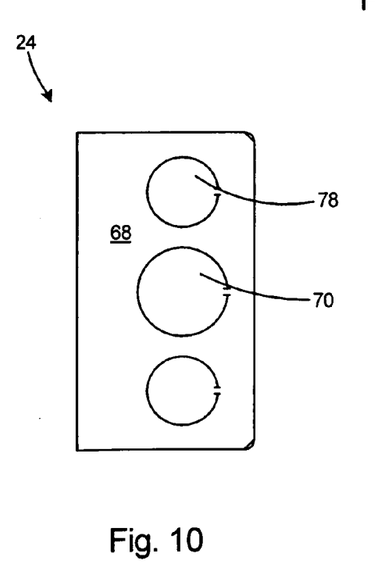
FIG. 10 is a side view of the electrical box of FIG. 9.
Figure 11:
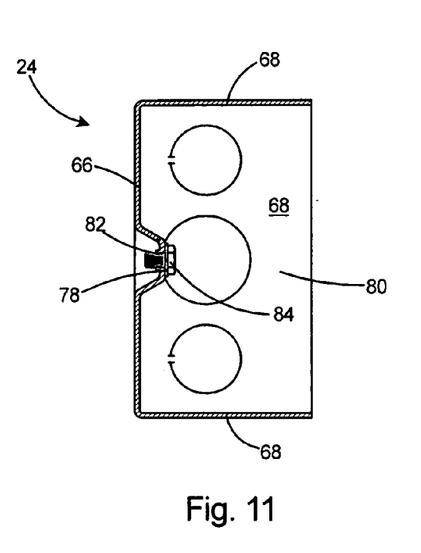
FIG. 11 is a sectional view of the electrical box taken along line 11-11 of FIG. 9.

Referring now to FIGS. 9-11, the electrical junction box 24 includes a bottom wall 66 and four sidewalls 68. A plurality of knockouts 70 are located on the bottom wall 66 and the sidewalls 68. The electrical junction box 24 includes four corners 72 and a bent over tab 74 with a threaded fastener 76 therein is provided at two of the opposing corners 72 arranged diagonally across from one another. As shown in FIG. 11, the bottom wall 66 of the electrical junction box 24 includes a raised area 78 pressed upward into the inner cavity 80 of the junction box. The raised area 78 includes a threaded bore 82 and a grounding screw 84 threaded therein. Two bores 85 are provided in the bottom wall 66 of the electrical junction box 24.

Figure 12:
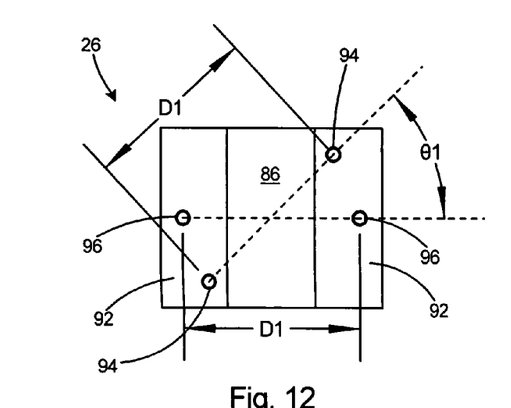
FIG. 12 is a top view of a center bracket that forms a portion of the hanger assembly of FIG. 1.
Figure 13:
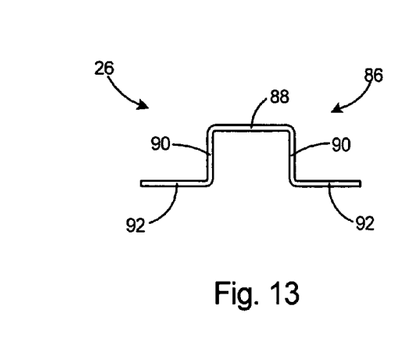
FIG. 13 is an end view of the center bracket of FIG. 12.
Figure 14:
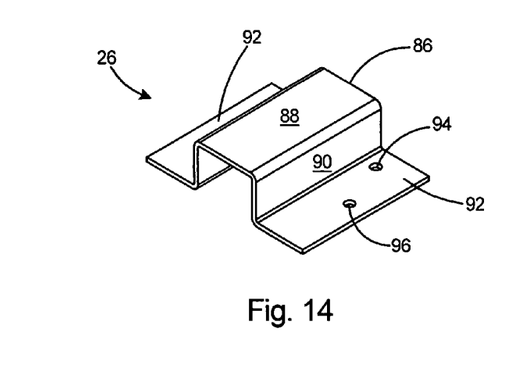
FIG. 14 is a perspective view of the center bracket of FIG. 12.

With reference to FIGS. 12-14, the center bracket 26 includes a U-shaped base portion 86 including a bottom 88 and two sides 90 and further includes two wings 92 extending orthogonally from the sides 90. Two pairs of paired threaded bores are provided in the wings 92 of the center bracket 26 including a first pair consisting of threaded bores 94 and a second pair consisting of threaded bores 96. As shown in FIG. 12, the angle $\Theta 1$ between the axis 97 through first pair of threaded bores 94 and the axis 98 through second pair of threaded bores 96 is preferably 45°. As is described hereinafter in the operation of the present invention, this angle is critical as it enables the electrical box 24 to be mounted square with the elongated bar 22 or at a 45° angle to the bar 22, at which 45° angle the electrical box 24 will be positioned in such a manner that all knockouts 70 (see FIG. 1) within the electrical box 24 will be available for use by the installer. The center to center distance D1 between threaded bores 94 is also equal to the center to center distance D1 between threaded bores 96. An equal distance between threaded bores 94 and threaded bores 96 is critical as it insures that both pairs of threaded bores will match up with apertures 85 in electrical box 24 (see FIG. 1) when the electrical box 24 is rotated 45° to change from the first orientation to the second orientation of the box 24 with respect to the bar 22.

Figure 15:
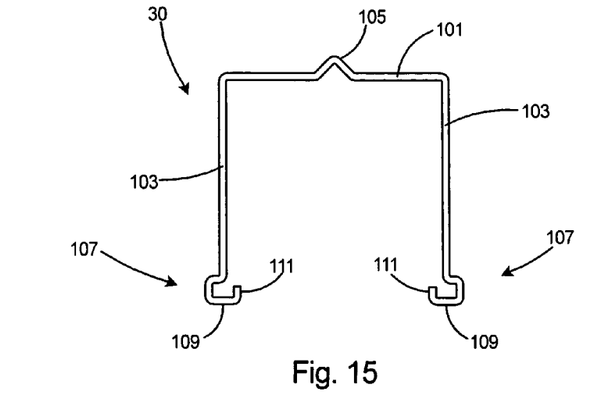
FIG. 15 is a plan view of an anchor bar that forms a portion of the hanger assembly of FIG. 1.

Referring to FIG. 15, the anchor bar 30 includes a top portion 101 and two legs 103 extending orthogonally from the top portion 101. Top portion 101 includes a V-shaped projection 105 therein. The legs 103 of the anchor bar 30 include a clip member 107 thereon. The clip members 107 are substantially C-shaped with a base portion 109 substantially parallel with the top portion 101 and an upward extending post 111 substantially parallel with the legs 103.

With reference to FIG. 1, the junction box hanger assembly 20 is provided as an assembly with the end pieces 28 integrally connected to the elongated bar 22 by rivets 113, which are shown exploded away from the elongated bar 22 for clarity, with threaded fasteners 76 secured in the tabs 74 of the electrical junction box 24. The junction box hanger assembly 20 includes anchor bar 30, electrical box 24, center bracket 26, and threaded fasteners 115, all of which can be supplied loosely in a package with the bar 22 and end piece 28 assembly or in an assembled state with electrical box 24 secured to the bar 22 by threaded fasteners 115 extending through threaded bores 94 or 96 of center bracket 26.

The elongated bar 22 is preferably constructed of 0.046-inch thick American Iron and Steel Institute (AISI) grade 1010 steel with a galvanized coating. The electrical box 24 and center bracket 26 are preferably constructed of 16-gage AISI 1010 steel with a galvanized coating. The end pieces 28 are preferably constructed of 0.062-inch thick AISI 1010 steel with a galvanized coating. The anchor bar 30 is preferably formed from 1008 or 1010 AISI steel rod of 0.188-inch diameter with a galvanized coating. Fasteners 115 for securing electrical box 24 to the elongated bar 22 are preferably #8–32×0.60-inch long tri-drive round head screws with locking serrations. The junction box hanger assembly 20 can be produced at low cost as all the components produced from sheet metal can be stamped and bent into shape, with the electrical box typically constructed of three pieces and welded together, and the anchor bar 30 simply cut to length and formed into the desired shape.

Figure 16:
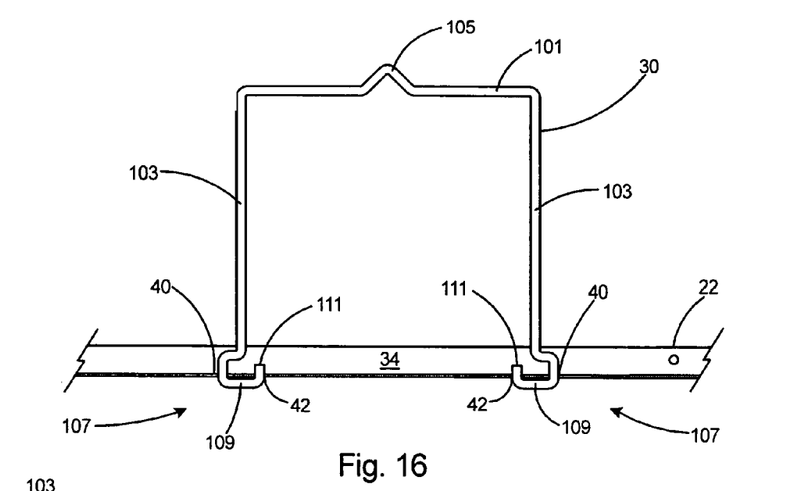
FIG. 16 is a sectional view of the elongated bar with the anchor bar attached thereto.
Figure 17:
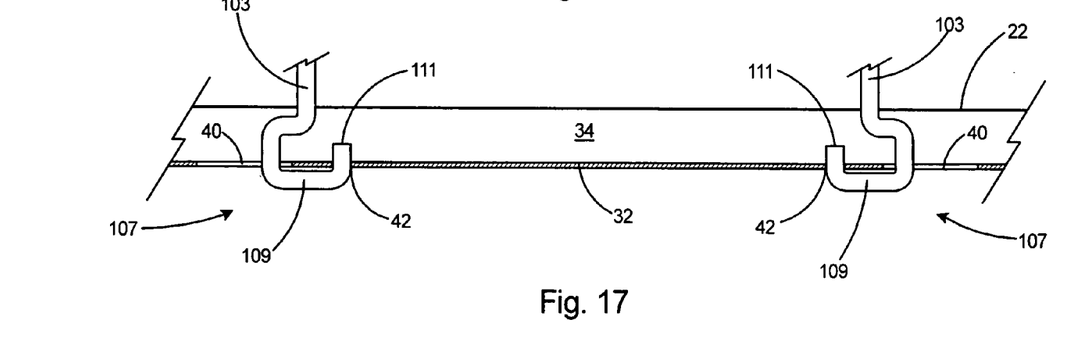
FIG. 17 is a detail view of a portion of FIG. 16 depicting the clip members attached to the elongated bar.

With reference to FIGS. 16-17, the anchor bar 30 is secured to the elongated bar 22 by simply spreading the legs 103 slightly apart until base portions 109 of clip members 107 pass through slots 40 in base portion 32 of bar 22 and then pressing inward and upward on legs 103 until posts 111 pass through round apertures 42. Thus connected to the bar 22, anchor bar 30 can be secured at V-shaped projection 105 by a chain or wire (not shown) to an overhead support.

Figure 18:
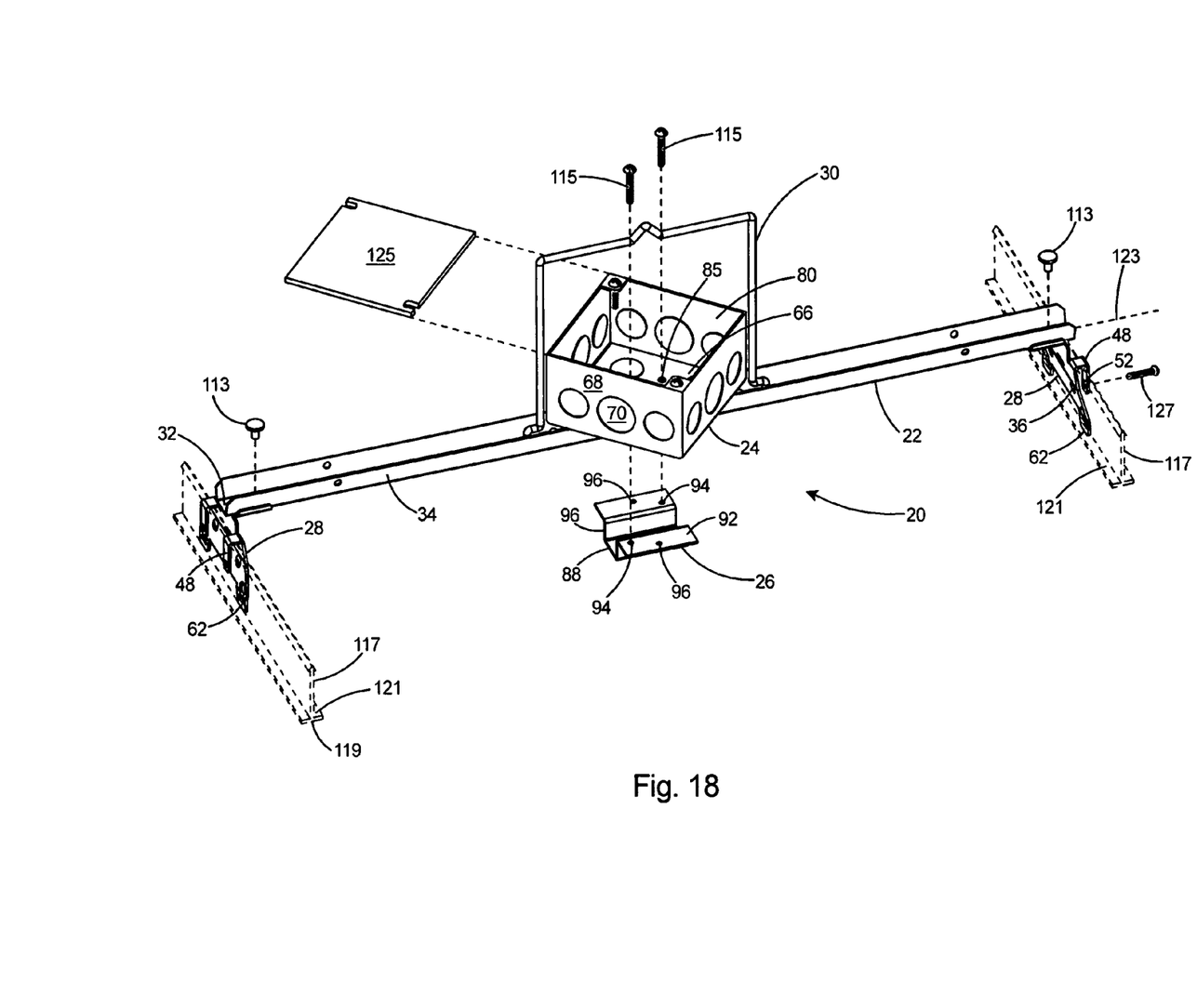
FIG. 18 is a perspective view of the suspended ceiling junction box hanger assembly installed on the rails of a grid support structure for a suspended ceiling.
Figure 19:
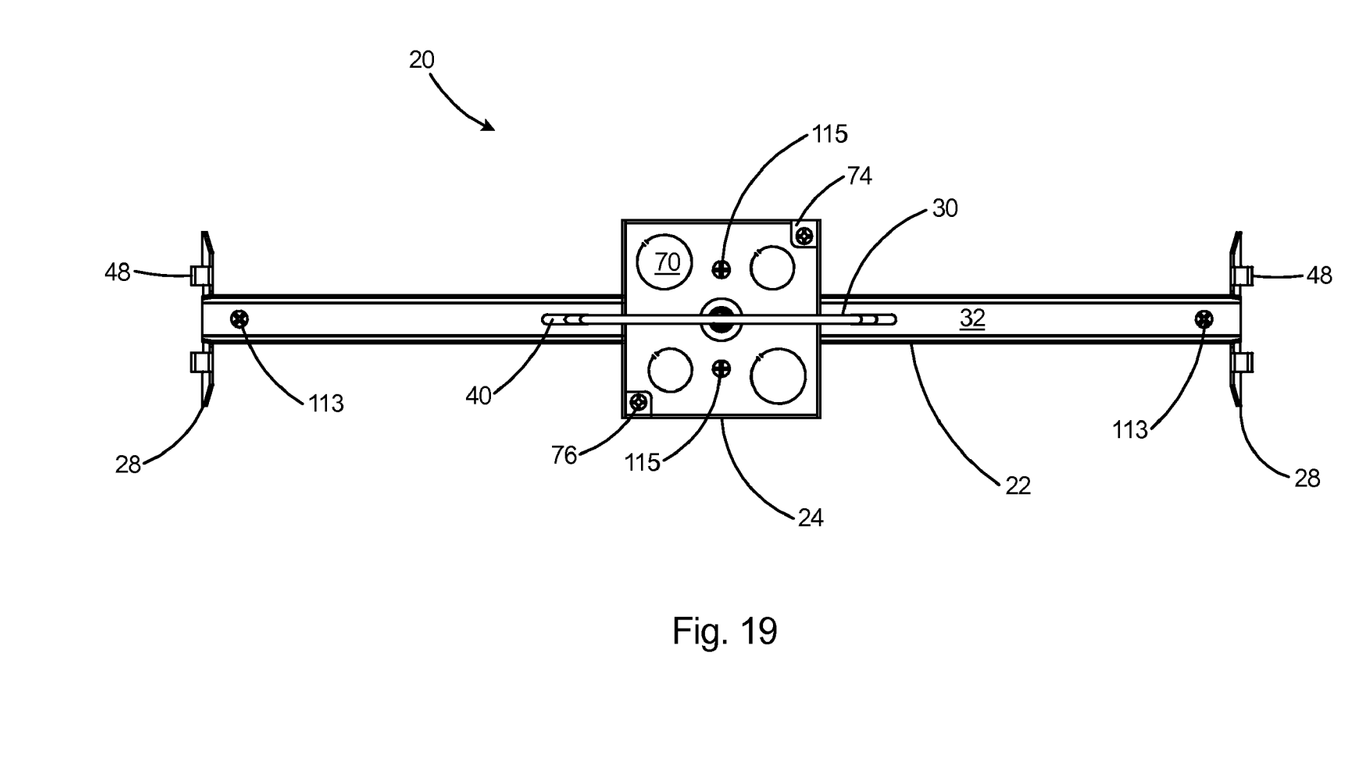
FIG. 19 is a top view of the suspended ceiling junction box hanger assembly with the electrical box mounted in a second orientation wherein the sidewalls of the electrical box are square with respect to the longitudinal axis of the elongated bar.

For operation of the junction box hanger assembly 20, reference is made to FIG. 18. Junction box hanger assembly 20 is placed over the T-rails 117 of a grid ceiling support structure 119 by simply pressing arms 48 of end pieces 28 over the T-rails 117 until the legs 62 of end pieces 28 rest on the horizontal flange 121 of the T-rails 117. FIG. 18 depicts electrical box 24 mounted in a preferred orientation with respect to the elongated bar 22, wherein the sidewalls 68 of the electrical box 24 are at a 45° angle with respect to the longitudinal axis 123 of the bar 22. To mount the electrical box 24 at the 45° angle, the installer simply tightens fasteners 115 through bores 85 of electrical box 24 into threaded bores 94 in center bracket 26. The electrical junction box 24 is tightened against the bar 22 until the bottom wall 66 of junction box 24 is flush against the top of the two upward extending sides 34 of the elongated bar 22 and wings 92 of center bracket 26 are flush against the bottom wall 66 of the electrical box 24. As both the bar 22 and center bracket 26 are of U-shaped cross-section, securing the electrical box 24 to the bar 22 also brings bottom 88 and sides 90 of center bracket 26 flush against the base 32 and sides 34 respectively of elongated bar 22, making for a conforming fit between the two U-shaped elements. After electrical cables or conduit (not shown) have been connected to the junction box 24 and wiring connections completed, a conventional electrical box cover plate 125, as shown in FIG. 18, can be secured to the junction box 24 to seal off the inner cavity 80. If desired, a fastener 127 may be driven through axially aligned apertures 52 in arm 48 and apertures 56 in end plate 46 to secure electrical box assembly to the grid ceiling support structure.

An alternative method of mounting the electrical box to the bar is with the sidewalls 68 of the electrical box 24 square with the elongated bar 22. With reference to FIG. 18, this is accomplished by simply rotating the electrical box 45° counterclockwise with respect to the bar 22 and inserting threaded fasteners 115 through bores 85 in electrical box 24 and into threaded bores 96 in center bracket 26. As the separation distance between bores 85 in electrical box 24 is equal to the separation distance between pair of threaded bores 94 and pair of threaded bores 96 respectively, center bracket 26 functions to mount electrical box 24 in either of two orientations with respect to the bar 22. As shown in FIG. 18, mounting the electrical box 24 at a 45° angle with respect to the bar 22 provides the advantage of freeing all knockouts 70 for use by the electrician. When installing electrical cables or conduit above a suspended ceiling, it is frequently necessary to have all knockouts available for use.

Having thus described the invention with reference to a preferred embodiment, it is to be understood that the invention is not so limited by the description herein but is defined as follows by the appended claims.

What is claimed is:

1. An electrical box hanger assembly for use on a suspended ceiling comprising:
   a one-piece elongated bar including a base portion, two sides extending upward from said base portion, a longitudinal axis, and two ends;
   an end piece secured to each end of said elongated bar, each of said end pieces including an end plate, two arms extending outward from said end plate, and two legs extending downward from said end plate;
   an electrical box extending upward from said elongated bar, said electrical box including a bottom wall in contact with said elongated bar, sidewalls, and a pair of apertures in said bottom wall;
   a center bracket for securing said electrical box to said bar, said center bracket is of substantially U-shaped cross-section including a bottom, two sides, and two wings extending from said sides of said center bracket;
   a fastening arrangement for securing said electrical box to said elongated bar in either of two orientations;
   said fastening arrangement for securing said electrical box to said elongated bar includes two pairs of apertures in said wings of said center bracket, each of said pairs of apertures aligned upon an axis, said axes through each of said pairs of apertures are at an angle of 45° with respect to one another; and
   said orientations including a first orientation with said sidewalls of said electrical box at a 45° angle with respect to said longitudinal axis of said bar and a second orientation with said sidewalls of said electrical box square with respect to said longitudinal axis of said bar.

2. The electrical box hanger assembly of claim 1 wherein said fastening arrangement for securing said electrical box to said elongated bar includes a pair of threaded fasteners for securing through said pair of apertures in said electrical box into one of said pairs of apertures in said center bracket for securing said electrical box to said bar and said center bracket.

3. An electrical box hanger assembly for use on a suspended ceiling comprising:
   a one-piece elongated bar including a base portion, two sides extending upward from said base portion, a longitudinal axis, and two ends;
   an end piece secured to each end of said elongated bar, each of said end pieces including an end plate, two arms extending outward from said end plate, and two legs extending downward from said end plate;
   an electrical box extending upward from said elongated bar, said electrical box including a bottom wall in contact with said elongated bar, sidewalls, and a pair of apertures in said bottom wall;
   a center bracket for securing said electrical box to said bar;
   a fastening arrangement for securing said electrical box to said elongated bar in either of two orientations;

said orientations including a first orientation with said sidewalls of said electrical box at a 45° angle with respect to said longitudinal axis of said bar and a second orientation with said sidewalls of said electrical box square with respect to said longitudinal axis of said bar;

each of said end pieces include a top member flush with said base portion of said bar; and said top member includes two upward extending side walls and an aperture therein.

4. The electrical box hanger assembly of claim 1 wherein each of said arms of said end piece includes an aperture therein;

said end plates of said end piece include a pair of apertures therein; and each of said apertures in said end plate is in axial alignment with one of said apertures in said arms.

5. An electrical box hanger assembly for use on a suspended ceiling comprising:

a one-piece elongated bar including a base portion, two sides extending upward from said base portion, a longitudinal axis, and two ends;

an end piece secured to each end of said elongated bar, each of said end pieces including an end plate, two arms extending outward from said end plate, and two legs extending downward from said end plate;

an electrical box extending upward from said elongated bar, said electrical box including a bottom wall in contact with said elongated bar, sidewalls, and a pair of apertures in said bottom wall;

a center bracket for securing said electrical box to said bar;

a fastening arrangement for securing said electrical box to said elongated bar in either of two orientations;

said orientations including a first orientation with said sidewalls of said electrical box at a 45° angle with respect to said longitudinal axis of said bar and a second orientation with said sidewalls of said electrical box square with respect to said longitudinal axis of said bar;

an anchor bar for anchoring said hanger assembly from an overhead support;

said anchor bar includes two legs extending from said base portion of said elongated bar, a top portion extending between said legs of said anchor bar, and a clip member on each of said legs;

said clip members each include a base portion substantially perpendicular to said legs and a post portion extending from said base portion; and said post portion is substantially parallel to said legs.

6. The electrical box hanger assembly of claim 5 including two paired arrangements of slots and round apertures in said base portion of said bar; and said paired arrangements of slots and round apertures in said base portion of said bar engage said clip members of said anchor bar, whereby said post portion of said clip members extend through said round apertures in said bar.

7. The electrical box hanger assembly of claim 1 wherein said electrical box includes a plurality of knockouts in said bottom wall and said sidewalls.

8. The electrical box hanger assembly of claim 1 wherein said electrical junction box includes four corners;

a bent over tab at two opposing corners of said electrical box;

a threaded bore in each of said tabs; and a threaded fastener in each of said threaded bores in said tabs.

9. The electrical box hanger assembly of claim 1 including a raised area on said bottom wall of said electrical box; and a threaded bore in said raised area; and a grounding screw in said threaded bore of said raised area.

10. The electrical box hanger assembly of claim 8 including a cover plate for securing to said tabs of said electrical box.

11. The electrical box hanger assembly of claim 5 wherein said anchor bar is formed of a steel rod having a circular cross-section.

12. The electrical box hanger assembly of claim 1 wherein said elongated bar, said electrical box, said end pieces, and said center bracket are each formed from steel plate.

13. The electrical box hanger assembly of claim 7 wherein said first orientation of said electrical box with respect to said elongated bar renders all of said knockouts available for connection to conduit or electrical cables.

14. The electrical box hanger assembly of claim 4 wherein said apertures in said end plates are axially aligned with said apertures in said arms thereby enabling passage of a fastener there through for anchoring said hanger assembly to a grid support structure for a suspended ceiling.

15. The electrical box hanger assembly of claim 1 wherein said elongated bar is of substantially U-shaped cross-section.

* * * * *